United States Patent Office 2,752,359
Patented June 26, 1956

2,752,359

ANTIMICROBIAL AGENTS

Walter D. Celmer, Garden City, N. Y., assignor to Chas. Pfizer & Co., Inc., Brooklyn, N. Y., a corporation of Delaware No Drawing. Application October 6, 1952,
Serial No. 313,349

7 Claims. (Cl. 260—326.3)

This invention is concerned with a process for the preparation of new organic compounds. It is also concerned with the preparation of a hydrolysis product of the antibiotic acetopyrrothine (also known by the registered trademark "Thiolutin") and with the synthesis of this antibiotic.

Acetopyrrothine is a new antibiotic described and claimed in the copending patent application of Tanner et al., filed on May 3, 1950 as Serial No. 159,856 (now U. S. Patent No. 2,689,854). It is a highly active compound which may be prepared by the growth of microorganisms in nutrient media under certain conditions. Acetopyrrothine, although highly active, possesses certain disadvantages. One of these is its low solubility in certain of the media, especially aqueous ones, employed for disinfecting and other in vitro uses and for veterinary and such in vivo applications.

It has now been found that acetopyrrothine may be hydrolyzed by contacting it with a strong inorganic acid in a two-phase organic solvent-aqueous system. A basic compound results which is biologically active. Acetopyrrothine itself is neutral in reaction. The basic compound thus produced contains an amino group and is, in the form of its salts, highly soluble in water. It may be obtained in crystalline form and has been definitely characterized. Apparently an acetyl group is removed from the molecule, and the substance has therefore been termed pyrrothine. A variety of salts may be prepared by treatment of the basic compound with the appropriate acid. Since the product is of appreciable stability, the salts may be prepared in dry form or in solution.

It has been found that the amine obtained by hydrolysis of acetopyrrothine may be converted to an amide by treatment with an acylating agent. When the reagent is an acetylating agent such as acetyl chloride, acetopyrrothine itself is synthesized. In other words the acetyl group previously removed is returned. This compound has the full biological activity of acetopyrrothine prepared by fermentation. When a propionylating agent is used, the antibiotic propionopyrrothine (also known as aureothricin) is formed from the pyrrothine.

The conditions under which acetopyrrothine may be hydrolyzed to an amine are unique. The amine is not highly stable to hot, strongly acidic solutions which are required for hydrolysis. However, it has been found that, if acetopyrrothine is subjected to such conditions in the presence of a distinct organic solvent phase, the hydrolyzed product is at least partially extracted into the separate solvent phase and is not subject to the rapid destruction due to the hot acid solution. Thus, if acetopyrrothine is treated in refluxing dioxane with concentrated hydrochloric acid, a two-phase system is produced. In a short time the antibiotic is hydrolyzed and the resulting amine passes into the lower phase. The product may then be recovered. If a suitable concentration is used, a solid, often crystalline, product will separate during the hydrolysis. Other solvents may be used, such as dibutyl ether or other organic liquids which are stable under the conditions used and which form a separate phase even at the elevated temperatures of the reaction. Dioxane, however, is particularly useful for this purpose.

Various strongly acid hydrolysis agents may be used for the treatment of the antibiotic. These include mineral acids or strong organic acids. By "strongly acid" is meant a material having an ionization constant of at least $10^{-2}$. However, concentrated hydrochloric acid seems to be particularly useful for this purpose. Care must be taken to select an agent that is not highly destructive. As previously indicated, an elevated temperature is generally desirable, e. g. between 50° and 100° C.

The crude product produced by hydrolysis in hydrochloric acid may be purified by recrystallization from hot, dilute, hydrochloric acid. Color adsorbents, such as activated charcoal, may be used to remove colored impurities. The product may be obtained as yellow crystals. The monohydrochloride-monohydrate has been analyzed. This product possesses an activity of about 2600 units per milligram when assayed in a standard microbiological procedure using acetopyrrothine as a standard with a potency of 1000 units per milligram. This remarkable increase in activity is noteworthy. The monohydrochloride-monohydrate displays absorption maxima at 226, 309 and 381 m$\mu$. The compound possesses a neutral equivalent of 239.5 and has a pKa value of 2.9.

Anal.—Calcd. for: $C_6H_6ON_2S_2 \cdot HCl \cdot H_2O$: C, 29.94; H, 3.77; N, 11.64; S, 26.6; Cl, 14.7. Found: C, 30.22; H, 3.86; N, 11.67; S, 27.0; Cl, 15.0.

The hydrochloride may be readily converted to the free base by treatment in water with a base such as ammonia, pyridine, sodium hydroxide, and so forth. Alternatively, the product may be obtained by suspending the hydrochloride in chloroform and treating with anhydrous ammonia. The precipitated ammonium chloride is filtered and hexane is added to the filtrate to precipitate the base.

The amine obtained by hydrolysis of acetopyrrothine may be readily acylated by a variety of agents. These include acid chlorides, anhydrides and so forth. To prepare acetopyrrothine, an acetylating agent is used, such as acetyl chloride, acetic anhydride, katene, acetyl bromide and so forth. These reactions may be conducted in water or in a variety of organic solvents. If desired, a base may be utilized to combine with the hydrogen halide formed when an acid halide is used as the acylating agent. However, this is not essential. Acetopyrrothine obtained by treatment of pyrrothine with an acetylating agent is identical in every way with the product obtained by fermentation.

Not only may the acetyl derivative of the organic base from acetopyrrothine be prepared, but also a variety of salts of this derivative are available. These may be prepared by neutralizing the base with the chosen acid. One method given above for the preparation of the hydrochloride, that is, the hydrolysis of acetopyrrothine with hydochloric acid, may be used with a limited number of other acids, such as hydrobromic acid. Alternatively, the base may be treated in water or in organic solvents to obtain various salts. Care must be taken that acidic solutions are not allowed to stand for prolonged periods, since some destruction of the compound may occur. Salts such as the phosphate, sulfate, tartrate, citrate, and so forth may be prepared in this manner. The term "pyrrothines" has been used to describe not only the basic hydrolysis product but also its salts.

As noted above a variety of acylating agents may be used to convert pyrrothine to amides. When a propionylating agent is used, the amine is converted to the antibiotic propiono-pyrrothine or aureothricin (Japanese Med. J., v. 2, p. 85 (1949). Agents such as propionyl chloride, propionyl bromide, propionic anhydride and so forth may be used. Comparison of the synthetic compound with the fermentation product shows them to be identical. Various other acylating agents may be used to prepare a variety of novel amides, many of them biologically active.

The following examples are given by way of illustration and are not intended as a limitation of this invention. Indeed, as many apparently widely different embodiments of the present invention may be made without departing from the spirit and scope hereof, it is to be understood that the invention is only limited as defined in the appended claims.

*Example I*

To 100 milliliters of pure dioxane heated to reflux and containing 2.0 grams of acetopyrrothine was added 20 milliliters of concentrated hydrochloric acid. The mixture formed a two-phase system. In a few minutes the mixture became orange and then gradually changed to a brownish-green. After ten minutes at reflux a crystalline product began to separate. The mixture was cooled after refluxing for one-half hour. The product was filtered from the solution and dried. It weighed 0.9 gram. When the filtrate was cooled on ice a further 0.3 gram of solid separated. Three grams of brown product prepared in this manner were recrystallized by dissolving in 120 milliliters of hot water containing one gram of concentrated hydrochloric acid. The hot mixture was treated with one gram of bone black and filtered under nitrogen. The filtrate was cooled rapidly by means of a Dry Ice-acetone bath and the yellow crystalline product, weighing 2.1 grams, was filtered under nitrogen. This material proved to be the pure monohydrochloride-monohydrate of pyrothine.

*Example II*

The crystalline hydrochloride of the acetopyrrothine hydrolysis product was suspended in chloroform and anhydrous ammonia was bubbled into the mixture. The base dissolved in the solvent and crystalline ammonium chloride separated. The solid was filtered and the product was precipitated by means of hexane. The product was filtered and dried. This product proved to be the anhydrous basic hydrolysis product of acetopyrrothine, i. e. the amine form.

*Anal.*—Calcd. for: $C_6H_6ON_2S_2$: C, 38.70; H, 3.20. Found: C, 38.62; H, 3.76.

*Example III*

The hydrochloride of the acetopyrothine hydrolysis product prepared as described in Example I was added to chloroform and several equivalents of acetyl chloride with pyridine were added. The mixture was agitated for a short time and a crystalline product began to separate almost instantly. The product was filtered and dried. Comparison with acetopyrrothine proved the two materials to be identical.

*Example IV*

Pyrothine hydrochloride was dissolved in water and approximately three molecular proportions of acetic anhydride was added with stirring. A crystalline product began to separate in a short time. This material was filtered, washed and dried. A comparison with acetopyrrothine showed the two products to be identical.

*Example V*

Pyrrothine hydrochloride was added to chloroform and to the mixture was added several equivalents of propionyl chloride and pyridine. The mixture was stirred for a short time, whereupon a crystalline product separated. This material was filtered and dried. Comparison with an authentic sample of propiono-pyrrothine (or aureothricin) prepared by fermentation showed the two compounds to be identical. The synthetic product was analyzed.

*Anal.*—Calcd. for: $C_9H_{10}O_2N_2S_2$: C, 44.61; H, 4.16; N, 11.56. Found: C, 44.97; H, 4.12; N, 11.54.

*Example VI*

A sample of pyrrothine hydrochloride was dissolved in water and approximately three molecular proportions of propionic anhydride were added with stirring. The crystalline product began to separate almost immediately. This product was filtered, washed with water and dried. It proved to be identical with the material prepared according to Example V.

What is claimed is:

1. A process for the preparation of a biologically active compound which comprises heating acetopyrrothine with concentrated hydrochloric acid in a two-phase stable organic solvent-aqueous system.

2. A process for the preparation of pyrrothine which comprises heating acetopyrrothine with a two-phase system consisting of dioxane and concentrated hydrochloric acid.

3. A process for the preparation of an acetopyrrothine hydrolysis product which comprises heating acetopyrrothine with a two-phase dioxane-concentrated hydrochloric acid system and recovering the product thereby produced.

4. A process for the preparation of an acylated derivative of pyrrothine which comprises heating pyrrothine with an acylating agent.

5. A process for the synthesis of propionopyrrothine which comprises heating pyrrothine with a propionylating agent.

6. A process for the synthesis of acetopyrrothine which comprises heating pyrrothine with an acetylating agent.

7. A basic, biologically active hydrolysis product of acetopyrrothine having the formula $C_6H_6ON_2S_2$, a pKa value of 2.9 and which as the monohydrochloride-monohydrate displays absorption maxima in the ultraviolet region of the spectrum at 381, 309, and 226 m$\mu$, and the salts thereof.

References Cited in the file of this patent

UNITED STATES PATENTS 2,689,854    Tanner et al. _____ Sept. 21, 1954

OTHER REFERENCES

Plaut et al.: JACS, vol. 71, pp. 2264–2265, June 1949.

Kornfeld et al.: JACS, vol. 71, pp. 150–59, particularly page 158, January 1949.

Celmer et al.: "Jour. Am. Chem. Soc." vol. 77, pp. 2861–65 (1955).

K. Maeda: Japanese Med. Jr., vol. 2, pp. 85–87 (1949).